United States Patent

[11] 3,581,786

| [72] | Inventor | Matt A. Rigoni<br>Perry, Fla. |
|---|---|---|
| [21] | Appl. No. | 831,877 |
| [22] | Filed | June 10, 1969 |
| [45] | Patented | June 1, 1971 |
| [73] | Assignee | Fleco Corporation<br>Jacksonville, Fla. |

[54] APPARATUS FOR FELLING AND STACKING TREES
13 Claims, 7 Drawing Figs.

[52] U.S. Cl. .................................................. 144/3,
144/34
[51] Int. Cl. ................................................ A01g 23/02
[50] Field of Search .......................................... 144/3 (4),
34, 34 (5), 309 (34); 143/32 (34), 43 (34)

[56] References Cited
UNITED STATES PATENTS

| 3,198,225 | 8/1965 | Busch .......................... | 144/3 |
|---|---|---|---|
| 3,254,686 | 6/1966 | Boyd et al. ................. | 144/312 |

FOREIGN PATENTS

| 138,110 | 10/1960 | U.S.S.R. ..................... | 144/34 |

*Primary Examiner*—Gerald A. Dost
*Attorneys*—George H. Baldwin and Arthur G. Yeager ABSTRACT: A combination tree feller and stacker includes a fork lift and grapple having a tree shearing mechanism mounted on one of the arms of the fork so that a sheared tree falls across the fork and a plurality of trees may be successively sheared and held on the fork to expedite cutting and stacking of the trees.

PATENTED JUN 1 1971

INVENTOR
MATT A. RIGONI

BY
ATTORNEYS

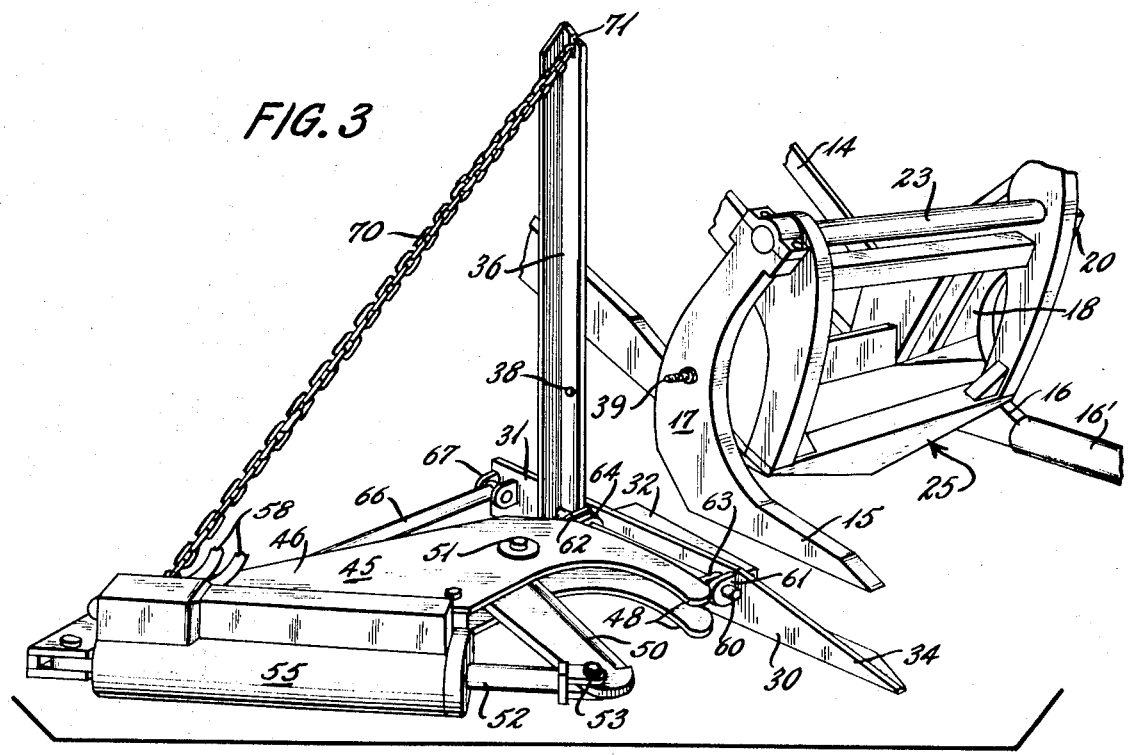
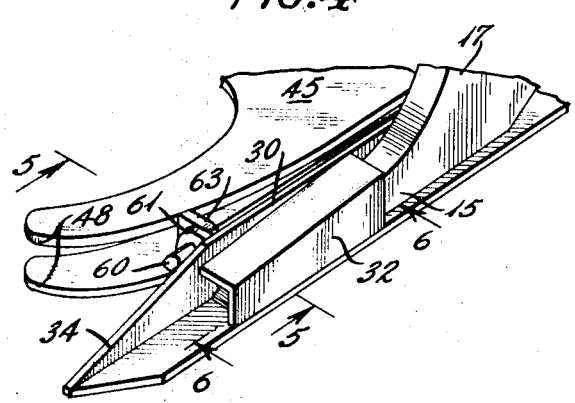
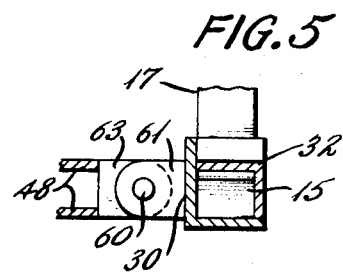
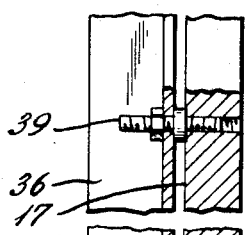
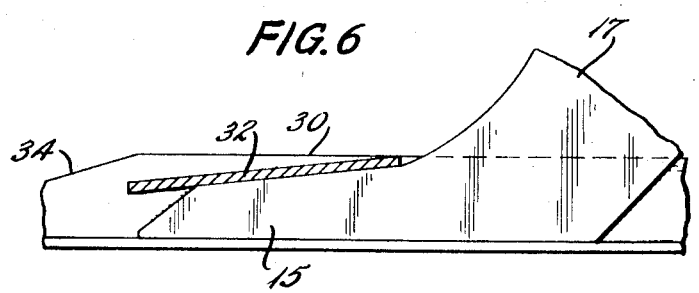
INVENTOR
MATT A. RIGONI

APPARATUS FOR FELLING AND STACKING TREES

BACKGROUND OF THE INVENTION

1. Field of the Invention

This invention relates to the harvesting of trees and more particularly those of a size which may be sheared close to the ground instead of having to be sawed. In woodlands such trees grow relatively close together along with a variety of other growth. Herebefore, it has been the practice to cut a number of such trees with one machine and then to transport them to a stacking area. This is a tedious operation since different machines have been used for the two operations and the fallen trees prior to being gathered obstruct access to those which have not been cut.

2. Description of the Prior Art

The prior art has included separate machines for shearing and harvesting. The U.S. Pat. to Pope, No. 2,882,941, however, relates to apparatus for felling and sawing into pulpwood lengths a relatively large tree which is held by the apparatus. Jaws clamping the tree support it during the various operations. Such apparatus, however, is not adapted for the multiple felling and stacking operation to which the present invention is directed.

SUMMARY OF THE INVENTION

It is an object of the invention to provide a relatively simple combined tree shearer and stacker which may be mounted on a conventional tractor and is so constructed and arranged that is may sequentially shear onto its fork and secure thereon a substantial number of trees. The combined apparatus may be elevated and lowered and the outer portion of the shearing mechanism may be raised independently of the fork and operate in different positions in order to permit the cutting of trees adjacent to obstacles such as stumps. The shearing mechanism may be quickly attached and removed from the fork to permit independent operation of the fork mechanism or to facilitate transport. The apparatus facilitates the felling and sorting of trees by size. For example, relatively small trees may be sheared and a substantial number carried on the fork and stacked in a given pile. Larger trees may be handled in smaller numbers or individually as required and stacked separately.

These and other objects of the invention will become apparent from the following description in conjunction with the following drawings in which:

FIG. 3 is an enlarged perspective of the apparatus from the same viewpoint as in FIG. 1 and illustrating the fork lift and grapple separated from the shearing mechanism;

FIG. 4 is an enlarged fragmentary perspective of the side of the shearing mechanism, showing the details of the mounting sleeve;

Figures 1, 2:
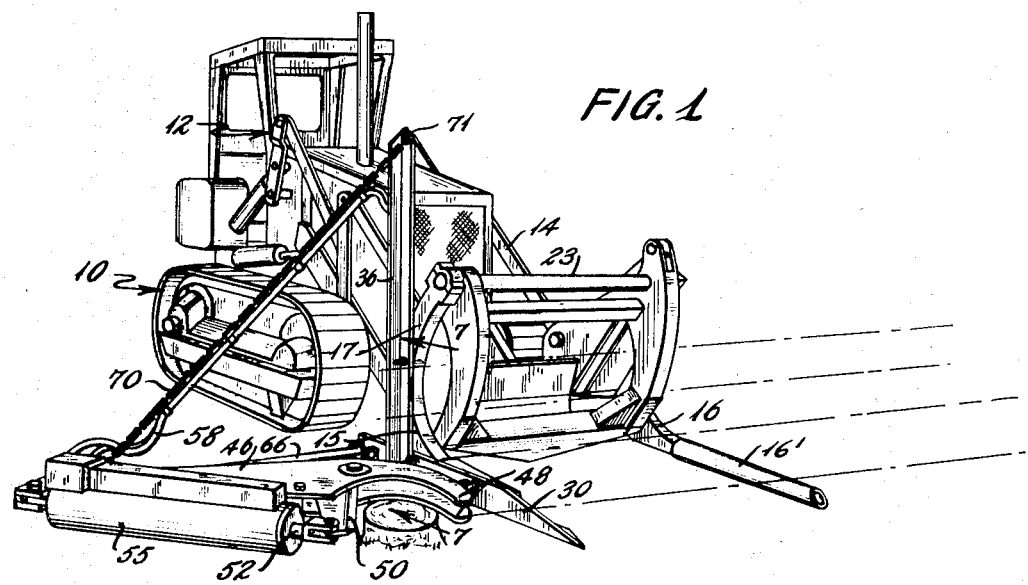
FIG. 1 is a perspective of a tractor with the apparatus of the present invention mounted thereon, illustrating the tree cutting position.
FIG. 2 is an enlarged perspective taken from the rear and illustrating details of mounting.

FIGS. 5 and 6, enlarged sections on the lines 5-5 and 6-6, respectively, of FIG. 4, and FIG. 7, a section on the line 7-7 of FIG. 1.

With further reference to the drawings, there is illustrated a tractor 10 of conventional structure having the usual source of power and hydraulic lines. The tractor has mounted for operation at its front a linkage system 12 connected to C frame arms 13, 14 which may be raised and lowered. The linkage is conventional and permits raising of the arms in a parallelogram arrangement so that the tines or fork lift arms 15, 16 of a fork lift may be translated vertically or raised about the pivot to which the arms 13, 14 are connected. The fork lift includes right and left sides 17, 18 with the tines 15 and 16 extending forwardly, and substantially upright rear portions 19, 20. Shaft 23 extends between the bearing portions 24. It will be seen that arms or tines 15 and 16 are generally aligned with the respective sides of the tractor and that they are disposed so as to extend forwardly from the front of the tractor.

The fork preferably is provided with a grapple 25 which is pivoted to the shaft 23 and may be raised and lowered from the operator's position.

The mounting for the shearing mechanism or tree cutting assembly includes arm 30 of angle iron having a rearward portion 31, angle member 32 at the side, and a forwardly extending tine portion 34. The arm 30 and angle member 32 cooperate to provide a mounting sleeve or box for snugly receiving the forward portion of the tine 15, thereby mounting the arm 30 on the tine.

In order to provide additional mounting support an upright angle iron post 36 is connected adjacent to the rear of the arm 30 and has an opening 38 for receiving a fastener 39 which is welded to the side 19 of the member 17. The arm 30 is, thus, securely mounted on the right side of 17 of the fork and supports the shearing mechanism.

The shearing mechanism includes a main body 45 having an outer arm portion 46 and a substantially C-shaped clasping jaw member portion 48 which has upper and lower members. A cooperating slicing blade member 50 is pivoted at 51 between the clasping arm members 48 and is connected adjacent to its outer portion to the piston 52 at pivot 53 of an hydraulic cylinder 55. The cylinder is double acting and is supplied with fluid under pressure through lines 58 to swing the blade from the retracted outer position, which is shown in FIG. 1 and which corresponds to the open throat condition of the cutting assembly with the assembly conditioned to receive a tree into the open throat through the front opening thereof, in a lateral inward direction toward cooperating jaw member 48 and, accordingly, toward arms or tines 15 and 16, and finally into a closed position at the jaw member or at least sufficiently close to the jaw member that the trunk of a standing tree which is disposed in the throat is severed and the tree felled. Since the blade moves laterally toward the tines 15 and 16, a tree felled in the manner described will fall into a position laterally across the forward path of the tractor. If the tines are empty, the tree normally falls across the tines. If the fork is loaded with other trees, the severed tree may fall into a position laterally of but in front of the tines. Lines 58 are further operable to retract blade 50 into its outer open throat position following the cutting of one tree to ready the cutting assembly for receiving and cutting the next tree.

The shearing mechanism is mounted on the arm 30 by a pivot rod 60 which passes through aligned apertures in ears 61, 62 on the arm 30 and 63, 64 on the arm members 48. In order to further support the shearing mechanism against rearward movement in a horizontal plane, a bracing rod 66 is pivotally mounted at one end between projections 67 at the rear of the arm 30 and at the other end by fastener 68 to the outer portion of the shearing mechanism.

In order flexibly to hold the shearing mechanism in a predetermined position, a chain 70 is adjustably connected at one end through slot 71 in the upper portion of the post 36 and at its other to the outer portion of the shearing mechanism. Due to the nature of this connection, the chain permits pivoting upwardly of the shearing mechanism about the pivot rod 60 in the event that an obstruction is encountered such as a stump. The elevation of the shearing mechanism in such manner does not prevent its effective shearing operation.

With the shearing mechanism mounted as described, the tapered tine portion 34 extends substantially forwardly of the fork lift tines, thereby providing, with the oppositely disposed extended tine, an extended pair of supporting arms on which one or more trees may be temporarily supported and carried to another location.

Since forward motion of the extended arms against resistance tends to push the mounting sleeve onto the tine 15, normal operation tends to maintain the interengagement of the parts.

In the operation of the device, the shearing mechanism is mounted on the side 17 of the fork in the manner described. The length of tine 16 is preferably extended to be equal to that of the arm portion 34 by placing an extension such as a pipe 16' over the end of the arm 16. The operator then is ready to move in position to harvest trees. He moves the tractor until a tree is received within the throat of the cutting assembly between blade 50 and jaw member 48 and then operates the hydraulic mechanism to slice the tree which falls across the arms 15, 16. The tractor is then moved forwardly as may be required with the grapple 25 raised to cause the tree to move to the rear on the fork. The grapple is then lowered to hold the tree in position. The operator then moves to the next tree which is then sheared and falls across or laterally in front of the fork. He then elevates the grapple and again moves forward sufficiently to cause the newly cut tree to be pushed to the rear of the fork whereupon the grapple is then lowered to hold both trees. This process is repeated until the operator has an adequate load on the fork. He then elevates the load by operation of linkage 12 to raise C-frame 13, 14 and drives the tractor to the stacking area and dumps the trees, whereupon he is ready to start the cycle anew.

Instead of cutting and gathering a load of small trees, the operator may cut one or more larger trees and push these one or two at a time to a desired area.

In moving about the operator may be required to lift the fork with the shearing mechanism attached in order to clear any obstacles which may lie in the path of the tractor. In the event that, when the fork is lowered beside a tree which is to be cut, the shearing mechanism is obstructed from being fully lowered by an object such as a stump, the chain and pivotal mounting permit the cutting mechanism to tilt upwardly a substantial amount in order to clear such obstacle and still permit operation of the shearing mechanism.

I claim:

1. A combination tree feller and loader comprising a frame for mounting on the lifting arms of a tractor, said frame having forwardly extending arms and an upright rear portion, shear means mounted on one of said arms and extending to the side thereof away from the other arm, said shear means having a base portion with a jaw member and a cooperating slicing blade member, said jaw member attached to one of said arms and extending forwardly along said arm, said slicing blade member having an end pivotally mounted on the base portion and movable horizontally toward and away from said jaw member and substantially in the plane thereof, power means mounted on said base portion and connected to said slicing blade, and means for operating said power means.

2. The invention of claim 1, and grapple means, pivot means mounting said grapple means on said upright rear portion and spaced from said arms, and means to raise said grapple means away from said arms and for closing said grapple means toward said arms.

3. The invention of claim 1, in which said shear means is pivotally connected to an arm extension member which is substantially parallel to said one of said arms and adjacent to the jaw member, said extension arm member having a mounting sleeve portion adapted to receive the forward end portion of said one arm.

4. The invention of claim 3, and flexible means for supporting the portion of the shear means which is away from the extension arm member, said flexible means permitting lifting of the shear means about its pivot.

5. The invention of claim 1, in which means are provided for substantially extending the effective length of the other of said arms.

6. The invention of claim 3, and bracing means pivotally mounted on the rear of said extension arm member and connected to the shear means, the pivotal mounting permitting movement of the rod only in a vertical plane.

7. In a tree feller and loader, the combination of a pair of arms, mounting means interconnecting said arms in side by side spaced relation and adapted and arranged to mount said arms in forwardly extending positions on the C-frame of a tractor, tree cutting means comprising a frame having a jaw portion, a blade movably carried by said frame member for movement in a horizontal plane, said blade having a cutting edge disposed toward said jaw portion, and means connected between said frame and blade for moving said blade edge horizontally toward and away from said jaw portion, said cutting means opening forwardly to receive the trunk of a tree to be felled between said blade and said jaw portion, and means connecting said frame member to one of said arms with said jaw portion disposed outwardly thereof and extending therealong and with said blade outwardly of said jaw portion whereby the tree felled by said cutting means falls across said arms.

8. The combination according to claim 7 and a grapple overlying said arms hingedly mounted to said mounting means, and means for hingedly moving said grapple upwardly and forwardly to receive felled tree trunks onto said arms and downwardly and rearwardly to retain tree trunks on said arms.

9. In combination, a pair of fork lift arms having rearward end portions, means for mounting the rearward end portions of said arms on the front of a tractor with each said arms extending forwardly and respectively generally aligned with one and the other side of the tractor, a tree cutting assembly having a forwardly opening throat to receive the trunk of a standing tree to be cut, said tree cutting assembly comprising a horizontally laterally movable cutting member defining one side of said throat, said member being movable from an open throat retracted position into an extended position in which said throat is substantially closed, means mounting said shear outwardly alongside of one of said arms and forward of said rearward end portion thereof with said opening disposed forwardly and with said cutting member defining the outer side of said throat, and means for moving said cutting member from its open position in a direction toward said one arm against and sufficiently through the trunk of a standing tree disposed in said throat to fell the tree into a position laterally in front of the tractor and forwardly of said rearward ends of said arms.

10. The combination according to claim 9 wherein said tree cutting assembly includes a base member including a jaw portion disposed outwardly along said one arm, said cutting member comprises a shearing blade cooperative with said jaw portion, and said means for moving said cutting member comprises a hydraulic cylinder and piston assembly connected between said blade and said base member.

11. The combination according to claim 9 and a grapple element hingedly connected to said mounting means for movement about a horizontal lateral axis and means for moving said grapple element.

12. A tree feller and carrier comprising a frame, a pair of tines mounted in spaced apart relation on and extending forwardly of said frame, a tree shear disposed in a position adjacently outwardly of one of said tines, said shear being horizontally oriented and operable to shear the trunk of a standing tree, and means for supportingly mounting said frame and shear to and at the front of a tractor, said last means comprising means for moving said shear and tines from generally horizontal ground engagement into raised positions.

13. The combination according to claim 12 wherein a grapple is swingably connected to said frame and means are provided for swinging said grapple against tree trunks disposed across said tines.